US012587952B2

(12) United States Patent
Bhat

(10) Patent No.: US 12,587,952 B2
(45) Date of Patent: Mar. 24, 2026

(54) SYSTEM FOR AND METHOD OF ACCESS PROTOCOL

(71) Applicant: Avago Technologies International Sales Pte. Limited, Singapore (SG)

(72) Inventor: Ashwini Shekhar Bhat, Bengaluru (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 324 days.

(21) Appl. No.: 17/943,970

(22) Filed: Sep. 13, 2022

(65) Prior Publication Data

US 2024/0089839 A1      Mar. 14, 2024

(51) Int. Cl.
*H04W 48/16*         (2009.01)
*H04W 8/22*          (2009.01)
*H04W 72/542*        (2023.01)

(52) U.S. Cl.
CPC ............. *H04W 48/16* (2013.01); *H04W 8/22* (2013.01); *H04W 72/542* (2023.01)

(58) Field of Classification Search
CPC ....... H04W 8/22; H04W 48/08; H04W 48/16; H04W 48/18; H04W 72/542; H04W 84/12
See application file for complete search history.

(56) References Cited

U.S. PATENT DOCUMENTS

| | | | | |
|---|---|---|---|---|
| 2018/0255149 A1* | 9/2018 | Yong | ......................... | H04W 4/50 |
| 2019/0320407 A1* | 10/2019 | Goyal | ................. | H04L 41/5058 |
| 2020/0213910 A1* | 7/2020 | Brown | ................ | H04L 43/0864 |
| 2023/0254732 A1* | 8/2023 | Kneckt | ............. | H04W 28/0284 |
| | | | | 370/229 |
| 2024/0089761 A1* | 3/2024 | Kumar | ................... | H04W 24/08 |
| 2024/0236829 A1* | 7/2024 | Kim | ....................... | H04W 72/23 |

* cited by examiner

*Primary Examiner* — Donald L Mills
(74) *Attorney, Agent, or Firm* — Foley & Lardner LLP

(57) ABSTRACT

The method includes providing at least one bit in an extended capability information element of a beacon frame or a probe response frame used during association of an access point and a station. The at least one bit indicates availability or unavailability of the access point to provide service to the station. The method also includes receiving the beacon frame or the probe response frame and cancelling the association in response to the at least one bit indicating the unavailability of the access point to provide the service to the station.

20 Claims, 6 Drawing Sheets

400

402 AP determine if connections are available

No → 408 Set bit to 1 in beacon or probe response

Yes

404 Reset bit to 0 in beacon or probe response

410 Receiving STA cancels authentication or probe request

406 Receive STA connection authentication

412 STA seeks connection with other APs

SYSTEM FOR AND METHOD OF ACCESS PROTOCOL

FIELD OF THE DISCLOSURE

This disclosure generally relates to systems for and methods of communication between a station (STA) and access point (AP) or between other communication devices.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As higher data throughput and other changes develop, newer standards are constantly being developed for adoption, such as a progression from IEEE 802.11n to IEEE 802.11 ac. Incoming connections must generally be accepted or authorized by STAs or APs. The protocol for accepting or authorizing connections can contribute to communication overhead.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
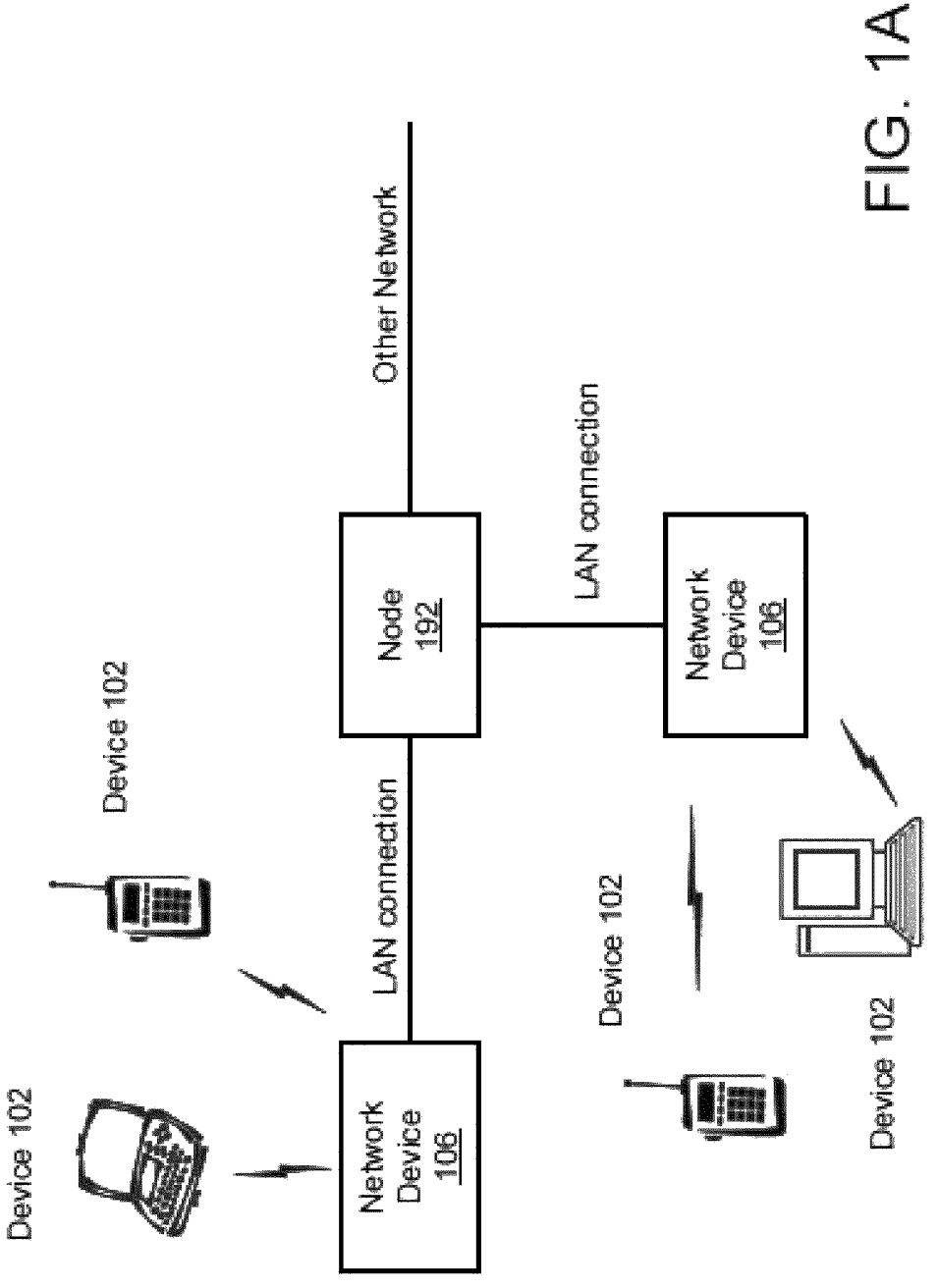
FIG. 1A is a block diagram depicting a network environment including one or more access points in communication with one or more devices or stations, according to some embodiments.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: WiFi Alliance standards and IEEE 802.11 standards including but not limited to IEEE 802.11a™, IEEE 802.11b™, IEEE 802.11g™, IEEE P802.11n™; and IEEE P802.11ac™ standards. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes embodiments of access protocols and methods and devices using access protocols.

Various embodiments disclosed herein are related to a protocol for authorizing or accepting new connections. The connections can be wireless connections to a STA or AP or among other types of communication devices. The STA or AP can be implemented in device comprised of one or more integrated circuits (ICs). In some embodiments, an AP is configured to provide accelerated connection acceptance or denial so that unnecessary frames and acknowledgments are not sent and received on the network. In some embodiments, the AP is configured to eliminate the transmission of three frames and three acknowledgments by the STA and AP when a rejection of an incoming connection occurs.

Systems and methods can advantageously employ a data unit (e.g., a bit) in a field to indicate availability of the AP or STA for new connections. In some embodiments, the data unit is a bit in an extended capability information element (IE). The extended capability information element (IE) is a field in a beacon frame and probe response frame that includes a bit position that can be used to indicate availability of the AP for new connections. The bit is provided in the bit position of the beacon frame or probe response frames and indicates AP availability to provide service to a new client in some embodiments. Providing service to a new client refers to the AP operating as a node for connection to a network for the new client. The new client can communicate with other devices on the network through the AP as part of the service provided by the AP. In some embodiments, the service is bridging traffic between mobile stations and other devices on the network after an authentication state and association state is reached by the STA. In some embodiments, the bit is set when the AP is not able to service any new client due to issues at the AP that are unrelated to the STA capability/configuration. The data unit indicating availability of the AP or STA for new connections can be provided in beacon frames, in an 855 load IE (e.g., for 802.11e), in a probe response, or in an association/reassociation response. The data unit (e.g., bit) indicating availability is reset by the AP once the AP is ready to service new clients or new connections in some embodiments.

In some embodiments, devices scanning for the AP parse the data unit (e.g., bit) indicating availability of the AP or STA for new connections in the beacon/probe response message and do not consider the AP as a viable target when the bit is set, thereby allowing the device to skip association attempts with the unavailable AP association and to direct association attempts to an available target AP. Systems and methods can advantageously reduce medium congestion because the number of frames being sent to and from the AP in an effort to attempt a connection with an unavailable AP are reduced. In some embodiments, the systems and methods can advantageously increase the chance of successful joins (because failed join operations can are be significantly reduced), reduce power consumption (because the number of frames being transmitted is reduced), and increase bandwidth utilization (because medium availability is increased due to the reduction in unnecessarily transmitted frames).

In some embodiments, devices scanning for the AP parse the data unit (e.g., bit) indicating availability of the AP or STA for new connections in the beacon/probe response message and do not consider the AP as a viable target when the bit is set, thereby allowing the device to skip association attempts with the unavailable AP association and to direct association attempts to an available target AP. Systems and methods can advantageously reduce medium congestion because the number of frames being sent to and from the AP in an effort to attempt a connection with an unavailable AP are reduced. In some embodiments, the systems and methods can advantageously increase the chance of successful joins (because failed join operations are be significantly reduced), reduce power consumption (because the number of frames being transmitted is reduced), and increase bandwidth utilization (because medium availability is increased due to the reduction in unnecessarily transmitted frames).

In some embodiments, the data unit (e.g., a bit) indicating availability of the AP or STA for new connections can also be extended to the reduced neighbor report (RNR) IE, thereby advertising availability of a 6G AP to accept new clients.

Some embodiments relate to a method. The method includes providing at least one bit in an extended capability information element of a beacon frame or a probe response frame used during association of an access point and a station. The at least one bit indicates availability or unavailability of the access point to provide service to the station. The method also includes receiving the beacon frame or the probe response frame and cancelling the association in response to the at least one bit indicating the unavailability of the access point to provide the service to the station.

In some embodiments, the beacon frame or the probe response frame is provided by the access point according to an 802.11 protocol. In some embodiments, the beacon frame or the probe response frame is provided by the access point according to an 802.11e protocol. In some embodiments, the at least one bit is provided in a BSS load information element. In some embodiments, the at least one bit is provided in an RNR information element. In some embodiments, the cancelling the association saves 40 milliseconds or more of time for completing association to another access point.

In some embodiments, the method also includes completing the association in response to the at least one bit indicating the availability of the access point to provide the service to the station. In some embodiments, the at least one bit is provided in the beacon frame and the association is cancelled before a probe request is provided to the access point from the station. In some embodiments, the station comprises laptop, a desktop computer, personal digital assistant, another access point or a Wi-Fi phone.

Some embodiments relate to an access point. The access point incudes circuitry configured to provide at least one bit of a beacon frame or a probe response frame used during association of the access point and a station. The at least one bit indicates availability or unavailability of the access point to provide service to the station.

In some embodiments, the beacon frame or the probe response frame is provided by the access point according to an 802.11 protocol. In some embodiments, the at least one bit is provided in an extended capability information element of the beacon frame or the probe response frame. In some embodiments, the at least one bit is provided in a BSS load information element of the beacon frame or the probe response frame. In some embodiments, the at least one bit is provided in an RNR information element of the beacon frame or the probe response frame. In some embodiments, the circuitry is configured to determine the availability or the unavailability of the access point to provide the service to the station and to reset the at least one bit when the access point has the availability. In some embodiments, the service is a new connection.

Some embodiments relate to a station. The station includes circuitry configured to receive a beacon frame or a probe response frame from an access point during association of the access point and the station. The circuitry is configured to process at least one bit indicating availability or unavailability of the access point in the beacon frame or the probe response frame to provide service to the station and cancel the association in response to the at least one bit indicating the unavailability of the access point to provide the service to the station.

In some embodiments, the at least one bit is received in an extended capability information element of the beacon frame or the probe response frame, in a BSS load information element of the beacon frame or the probe response frame, or in an RNR information element of the beacon frame or the probe response frame. In some embodiments, the circuitry is configured to provide the service to the station a probe request or an authentication request in response to the at least one bit indicating the availability of the access point to provide the service. In some embodiments, the circuitry is configured to process the at least one bit indicating the availability or the unavailability of the access point in the beacon frame and cancel the association in response to the at least one bit indicating the unavailability of the access point to provide the service to the station before providing a probe request to the access point.

A basic service set (BSS) load information element refers to a field that provides channel utilization information. The provision of the channel utilization allows an unassociated STA to choose a proper AP based on channel utilization. An extended BSS load information element provides spatial stream underutilization for a busy channel so that an unassociated STA with MU-MIMO capability can choose the proper AP. A BSS load information element can be a QoS Basic Service Set (QBSS) load element from the 802.11e standard. The QBSS load element is advertised in every beacon and every probe response frame of a QBSS in some embodiments.

A reduced neighbor report (RNR) load information element refers to a field that provides information about interfaces of the AP. The reduced neighbor report (RNR) load information element provides RNR information so that an unassociated STA can choose the proper AP in some embodiments.

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) or network devices 106, one or more stations or wireless communication devices 102 and a network hardware component or network hardware 192. The wireless communication devices 102 can for example include laptop computers, tablets, personal computers, and/or cellular telephone devices. The details of an embodiment of each station or wireless communication device 102 and AP or network device 106 are described in greater detail with reference to FIGS. 1B and 1C. The network environment can be an ad hoc network environment, an infrastructure wireless network environment, a subnet environment, etc. in one embodiment. The network devices 106 or APs can be operably coupled to the network hardware 192 via local area network connections. Network devices 106 are 5G base stations in some embodiments. The network hardware 192, which can include a router, gateway, switch, bridge, modem, system controller, appliance, etc., can provide a local area network connection for the communication system. Each of the network devices 106 or APs can have an associated antenna or an antenna array to communicate with the wireless communication devices in its area. The wireless communication devices 102 can register with a particular network device 106 or AP to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to network device 106 or AP.

In some embodiments, a network device 106 or AP includes a device or module (including a combination of hardware and software) that allows wireless communication devices 102 to connect to a wired network using wireless-fidelity (WiFi), or other standards. A network device 106 or AP can sometimes be referred to as a wireless access point (WAP). A network device 106 or AP can be implemented (e.g., configured, designed and/or built) for operating in a wireless local area network (WLAN). A network device 106 or AP can connect to a router (e.g., via a wired network) as a standalone device in some embodiments. In other embodiments, network device 106 or AP can be a component of a router. Network device 106 or AP can provide multiple devices access to a network. Network device 106 or AP can, for example, connect to a wired Ethernet connection and provide wireless connections using radio frequency links for other devices 102 to utilize that wired connection. A network device 106 or AP can be implemented to support a standard for sending and receiving data using one or more radio frequencies. Those standards, and the frequencies they use can be defined by the IEEE (e.g., IEEE 802.11 standards). A network device 106 or AP can be configured and/or used to support public Internet hotspots, and/or on a network to extend the network's Wi-Fi signal range.

In some embodiments, the access points or network devices 106 can be used for (e.g., in-home, in-vehicle, or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points or network devices 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points or network devices 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
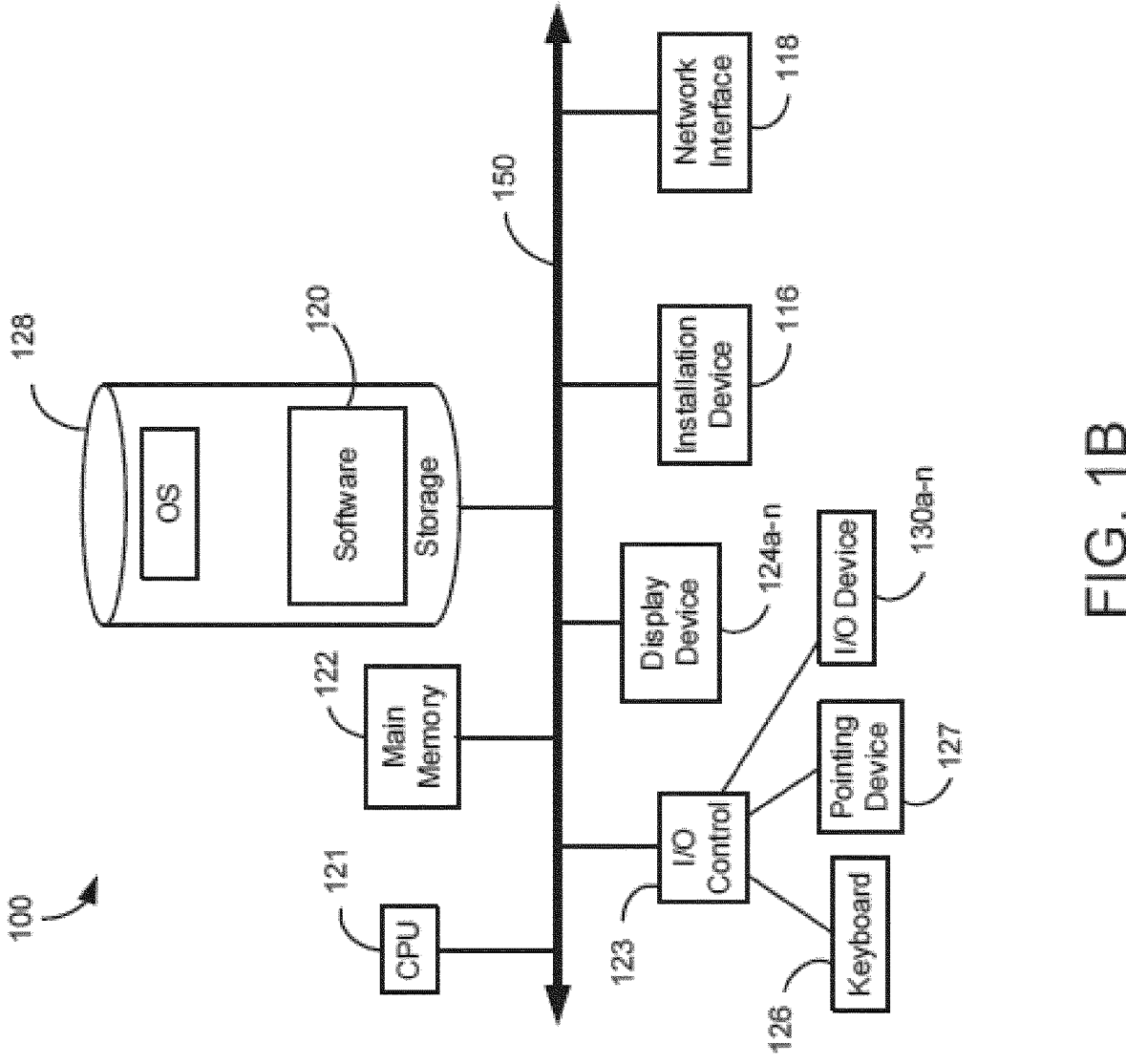
FIGS. 1B and 1C are block diagrams depicting computing devices useful in connection with the methods and systems described herein, according to some embodiments.
Figure 1C:
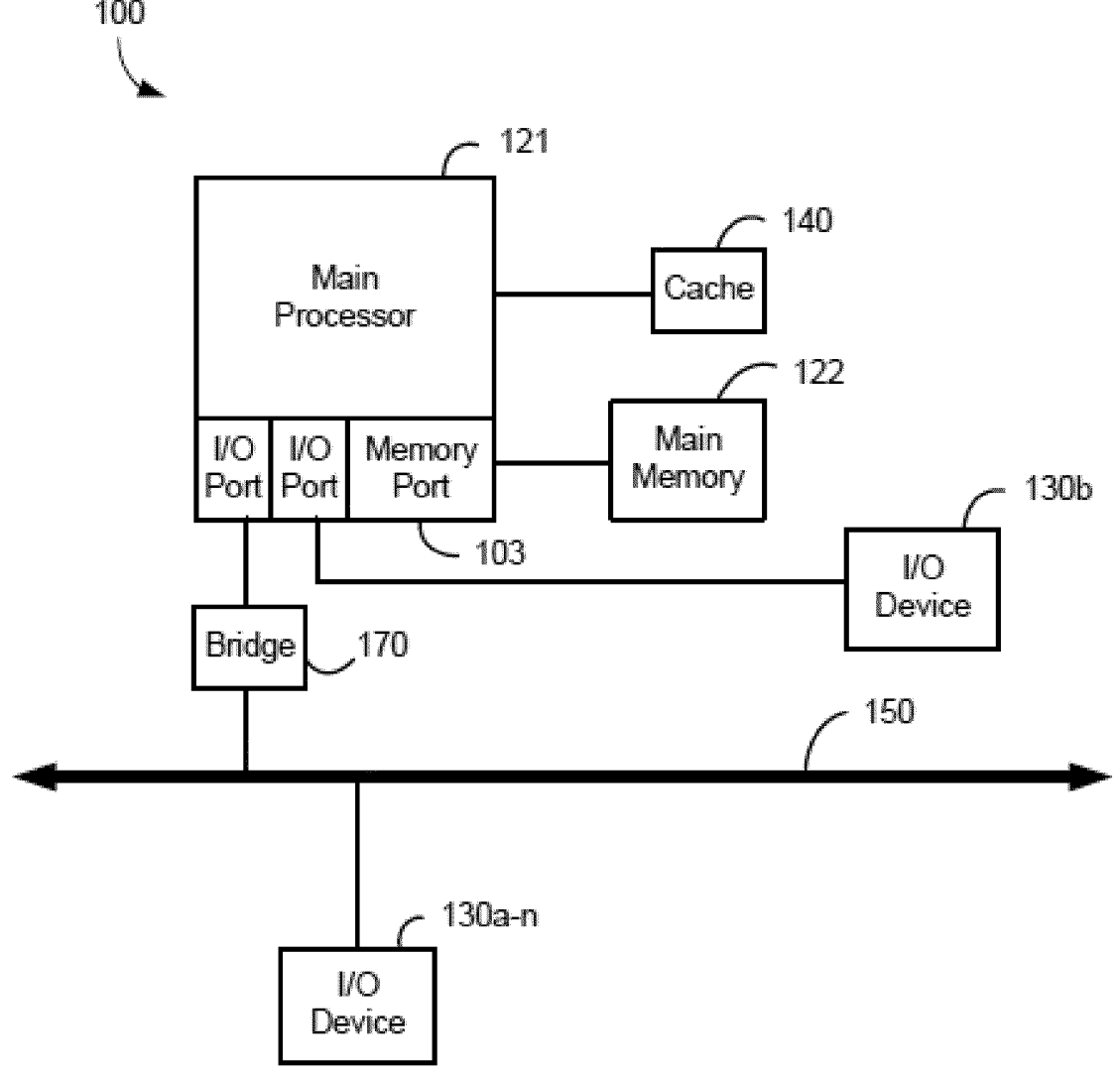

The communications device(s) 102 and access point(s) or network devices 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or network device 106. As shown in FIGS. 1B and 1C, each computing device 100 includes a processor 121 (e.g., central processing unit), and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit or processor 121.

The central processing unit or processor 121 is any logic circuitry that responds to and processes instructions fetched from the main memory unit 122. In many embodiments, the central processing unit or processor 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit or processor 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer or computer system 100 in which the main processor 121 can communicate directly with I/O device 130*b*, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11 b, IEEE 802.11g, IEEE 802.11 n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124*a*-124*n*. As such, any of the I/O devices 130*a*-130*n* and/or the I/O controller 123 can include any type and/or form of suitable hardware, software, or combination of hardware and software to support, enable or provide for the connection and use of the display device(s) 124*a*-124*n* by the computing device 100. For example, the computing device 100 can include any type and/or form of video adapter, video card, driver, and/or library to interface, communicate, connect or otherwise use the display device(s) 124*a*-124*n*. In one embodiment, a video adapter can include multiple connectors to interface to the display device(s) 124*a*-124*n*. In other embodiments, the computing device 100 can include multiple video adapters, with each video adapter connected to the display device(s) 124*a*-124*n*. In some embodiments, any portion of the operating system of the computing device 100 can be configured for using multiple display devices 124*a*-124*n*. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a fiber optic bus, a Serial Attached small computer system interface bus, a USB connection, or a HDMI bus.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system or computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Station and AP Communication

Disclosed herein are systems for and a methods of establishing communication between devices (e.g., a STA (e.g., wireless client) and an AP) according to some embodiments. In some embodiments, frames are provided with indications of whether the AP is available or unavailable for services (e.g., new connections). The AP and STA establish a wireless connection to communicate data. In some embodiments, establishing a connection involves a three-step process including probing, association and authentication. Generally, the probing process begins when a STA begins scanning the wireless frequencies for wireless APs or, if using ad hoc mode, other wireless devices. During the probing process, the STA sends a probe request. The probe request is a type of WiFi management frame that asks what networks or if specific networks are available on a particular channel and are sent using broadcast address in some embodiments. The probe request can be sent after beacon messages or frames are received from the AP in some embodiments. In some embodiments, probe requests include a particular network name or service set identifier (SSID). The probing process further includes providing a probe response from the AP in response to the probe request if the AP and the STA have compatible data rates. A probe response is a type of WiFi management frame provided in response to the probe request. The probe response includes the SSID (wireless network name), supported data rates, encryption types and other capabilities of the AP in some embodiments. After the probe response is received, the STA chooses an AP using the information in the probe response and other received probe responses from other APs, if any, and the probing process is complete.

After the probing process is complete, the authentication process begins so that an authenticated state can be achieved. Generally, the authentication process begins when the STA sends authentication request. The authentication process further includes providing an authentication frame from the AP in response to the authentication request. The authentication process is complete after the STA receives the authentication frame. At this point the STA is in an authenticated state but has not yet reached the associated state.

The association process is a process during which the STA reaches an associated state with the AP and can be an open or keyed association process. The association process begins after the authentication process when the STA determines with which AP it chooses to associate in some embodiments. The STA can select an AP based on the SSID, signal strength, and frame error rate characteristics associated with communication with the AP. Generally, the association process begins when the STA sends association request to the selected AP. The association request is management frame that contains chosen encryption types if required and other compatible 802.11 capabilities in some embodiments The association process further includes providing an association 1D for the AP in the AP and sending an association response from the AP in response to the association request. The association response is management frame that includes a success message granting network access to the STA. The association process is complete after the STA receives the association response and the STA reaches the associated state.

The STA is assigned channel of the AP and negotiates the use of a port. Keyed security measures are applied so communication can take place on the connection. After security requirements are met, an established IP-level communication connection is achieved and communication using networking standards and protocols is performed. The STA generally must be in an authenticated and associated state before the AP will bridge traffic between the STA and other devices on the network. Although association and authentication are described above, the systems and methods can be used with other access processes and protocols including access processes that do not use association or authentication. For example, the systems and methods can be used with an association protocol that is not followed by an authorization protocol.

APs can reject a new connection for a myriad of reasons. For example, the IEEE 802.11 standard provides the following reason codes for a rejection:

5—Disassociated because AP is unable to handle all currently associated stations
  32—Disassociated for unspecified quality of service (QoS)-related reason
  33—Disassociated as QoS AP lacks in sufficient bandwidth (BW) for this QoS STA.

These reason codes are provided in a disassociate/deauth frame. See IEEE 802.11 standard, Section 8.4.1.7. Status codes can be provided in response to management frames which are broadcast frames used by the IEEE 802.11 standard to permit a wireless client to negotiate with the AP. For example, the IEEE 802.11 standard provides the following status codes related to association:

12—Association denied for reason outside the scope of this standard
  17—Association denied because AP is unable to handle additional association stations (Applicable for non-QOS enhanced basic service set (QBSS) APs)
  30—Association denied temporarily, try again later
  32—Unspecified QoS—related failure
  33—Association denied as QoS AP has insufficient BW to handle another QoS STA
  34—Association denied due to excessive frame loss/poor conditions on current operating channel
  92—Re(association) refused due to external reason
  93—Re(association) refused due to memory limits at AP
  See IEEE 802.11 standard, Section 8.4.1.7.

Figure 2:
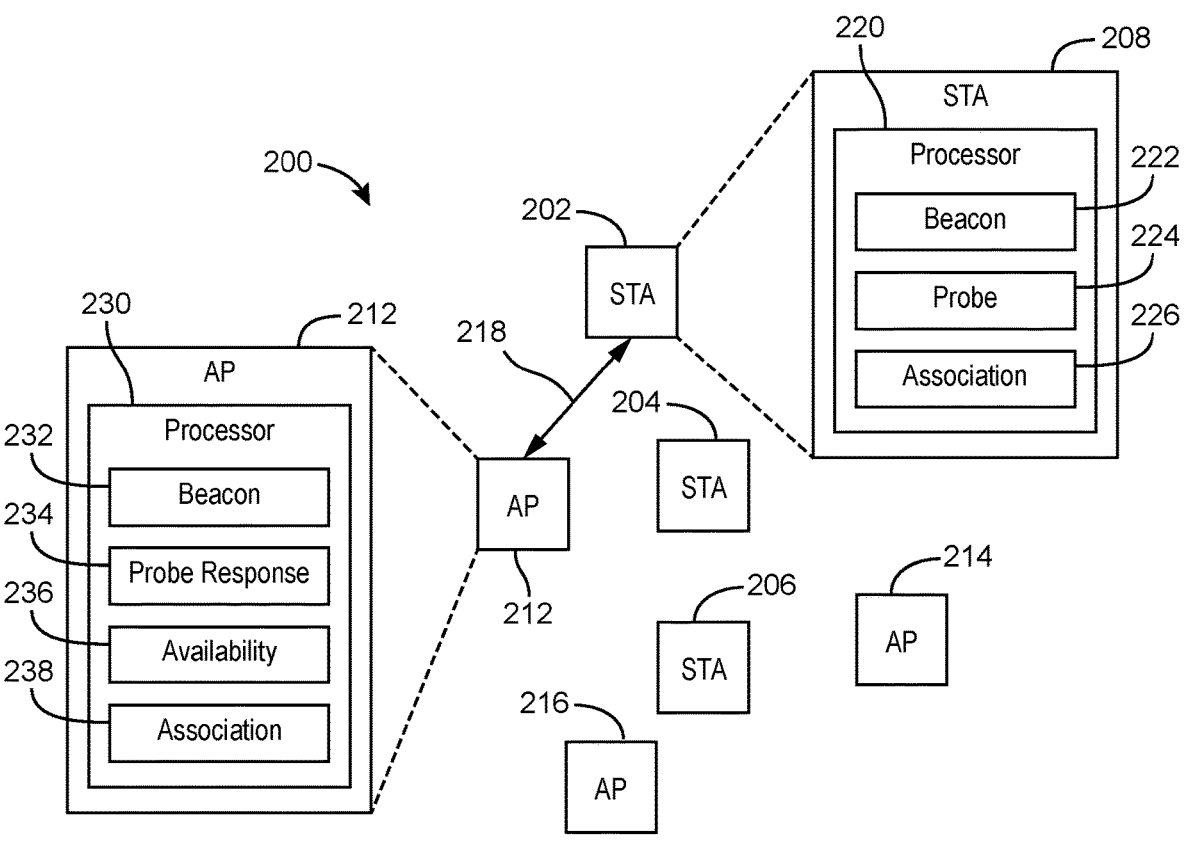
FIG. 2 is a block diagram depicting a network including access points (APs) and stations (STAs), according to some embodiments.

With reference to FIG. 2, a wireless communication network or system 200 includes STAs 202, 204, 206, and 208 and APs 212, 214, and 216. STAs 202, 204, 206, and 208 and APs 212, 214, and 216 can be used in the systems discussed with reference to FIGS. 1A-C. Any number of STAs 202, 204, 206, and 208 and APs 212, 214, and 216 can be used in the network or system 200.

A STA is any device for communicating in communication system 200 and includes but is not limited to a fixed, portable, or mobile laptop, desktop personal computer, personal digital assistant, access point, work station, wearable device, smart phone, or Wi-Fi phone. As used herein an "access point" (AP) refers to a device for communicatively coupling one or more "non-AP" devices (e.g., a client device) to a network. More specifically, an AP may enable non-AP devices to connect and communicate with a network. In some embodiments an AP may be a "wireless access point" (WAP) configured to enable wireless communication between non-AP devices. An AP includes but is not limited to a mobile, portable, or fixed hot spot, router, bridge, or other communication device. An AP can provide services to a STA, such as serving as a connection point to another network. STAs 202, 204, 206, and 208 and APS 212, 214, and 216 can each include a wireless transceiver and a various modules for communicating via connections. The modules can be software (e.g., firmware) and/or hardware components. In some embodiments, each of STAs 202, 204, and 206 and APS 212, 214, and 216 includes an IEEE 802.11 conformant media access control (MAC) circuit and physical layer (PHY) interface to the wireless medium and can be part of a larger device or system. In some embodiments, each of STAs 202, 204, 206, and 208 and APS 212, 214, and 216 operates according to other standards than IEEE 802.11.

A connection for wireless communication can be established between at least one of STAs 202, 204, 206, and 208 and APs 212, 214, and 216. For example, STA 202 has a connection 218 to AP 212. STAs 202, 204, 206, and 208 each include circuitry (e.g., a processor 230), and APs 212, 214, and 216 each include circuitry (e.g., a processor 220). The connection 218 is a wireless connection formed using an association and authorization operation in some embodiments.

Processor 220 of STA 208 includes a beacon module 222 configured to process a beacon message or frame, a probe module 224 configured to provide a probe or probe request message or frame, and an association module 226 for performing association operations for establishing a connection such as connection 218. Beacon module 222, probe module 224, and an association module 226 can be software (e.g., firmware) and/or hardware components.

Processor 230 includes a beacon module 232 configured to provide the beacon message or frame, a probe response module 234 configured to provide a probe response message or frame, an availability module 236 configured to determine if AP 212 is available or unavailable for a new service (e.g., a new connection), and an association module 228 for performing association operations for establishing a connection such as connection 218. Association modules 238 and 226 exchange data for establishing the connection and/or completing the association. Beacon module 232, probe response module 234, and availability module 236 can be software (e.g., firmware) and/or hardware components. A new service refers to new communication overhead or task and can include a new connection in some embodiments.

Figure 3:
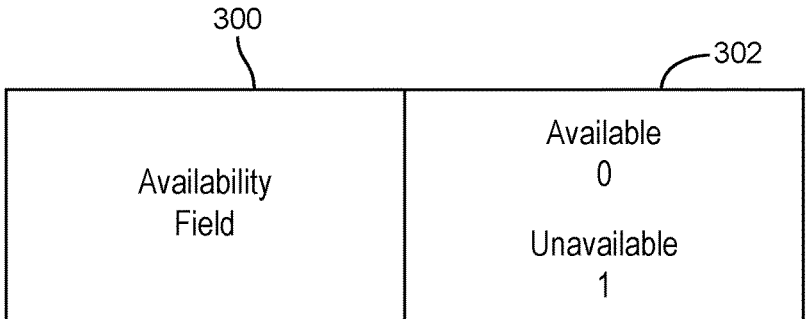
FIG. 3 is a block diagram depicting a field in a beacon frame or probe response frame that indicates availability of the AP or STA for new connections, according to some embodiments.

With reference to FIGS. 2 and 3, processor 230 is configured to provide a data unit such as a bit 302 in a field 300 that indicates whether the AP (e.g. AP 212) is available or unavailable to take on a new service or connection. The bit 302 in field 300 is provided by beacon module 232 or probe response module 234 in response to a determination by availability module 236 that the AP (e.g. AP 212) is available or unavailable to take on a new service or connection (e.g., can accept new clients). The bit 302 in field 300 is set when the AP is unavailable to take on a new service and is reset when the AP is available to take on a new service. The bit 302 in field 300 can be in an extended capability IE of the following frames: beacon frames, probe response frames, and association/reassociation response frames in some embodiments. In some embodiments, the bit 302 in field 300 can be in an 855 load IE under the IEEE 802.11 n standard.

Alternatively, the bit 302 can be incorporated into different IEs of different management frames or action frames in some embodiments.

Modules 232, 234, 236, and 238 can be implemented in AP software (e.g., MAC layer software). Modules 222, 224, and 226 can be implemented in STA software (e.g., MAC layer software). The processors 220 and 230 are any circuits or components that can perform logic and communication processing. In some embodiments, the processors 220 and 230 are implemented as a field-programmable gate array, an application-specific integrated circuit, hardware, a software executing processor, or state machines. In some embodiments, the processors 220 and 230 are parts of layers (e.g., MAC, network, PHY layers) of IEEE 802.11 standard devices. The processors 220 and 230 can be configured to perform communication operations, frame building and processing, association operations, authorization operations, and connection setup in some embodiments. Instructions for the processors 220 and 230 are stored in a non-transitory medium such as memory in some embodiments.

Figure 4:
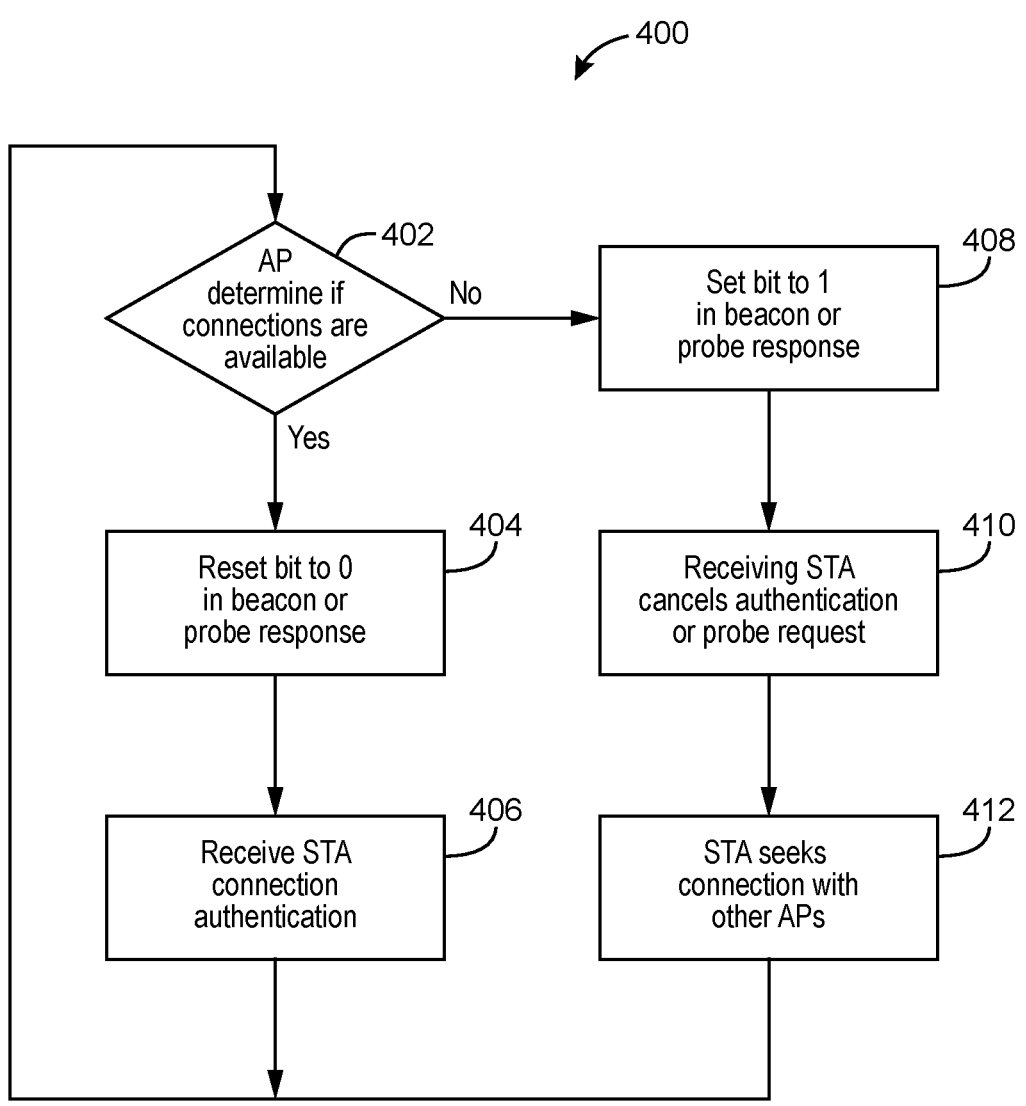
FIG. 4 is a flow diagram illustrating an example AP access operation for the network illustrated in FIG. 2 that uses the field illustrated in FIG. 3, according to some embodiments.

With reference to FIGS. 2-4, a flow 400 is used to establish a connection between at least one of STAs 202, 204, and 206 and at least one of APs 212, 214, and 216 or associate at least one of STAs 202, 204, and 206 and at least one of APs 212, 214, and 216. At an operation 402, AP 212 determines if it is available or unavailable to take on a new service or new connection. Operation 402 is performed by availability module 236 in some embodiments. Availability module 236 can determine if a new service is available by determining how many ports are available or by determining how much bandwidth is available. In some embodiments, data used for the reason codes for a rejections and status codes discussed above can be used to determine whether AP 212 is available or unavailable to take on a new service or connection. For example, if AP 212 determines it has insufficient bandwidth to handle another STA or determines it is unable to handle all currently associated stations, availability module 236 can determine that new services are unavailable.

If AP 212 is available, the data unit or bit 302 is reset to zero in field 300 in an operation 404. Field 300 is provided in a beacon frame or probe response frame in operation 404 by module 232 or module 234. A beacon frame or message is a type of management frame. The beacon frame is a data format for a periodic beacon message sent by AP 212 according to IEEE 802.11 standards in some embodiments. A probe response frame is a type of management frame. The probe response frame is a data format for a message sent by AP 212 in response to a probe message from STA 202 according to IEEE 802.11 standards in some embodiments.

The beacon message or probe response message is sent by AP 212 and received by STA 202 in an operation 406. STA 202 processes the beacon message using beacon module 222 or the probe response message using probe module 224 and completes association and authentication using association modules 238 and 226 to establish the new connection in response to the bit 302 being zero in some embodiments.

If AP 212 is unavailable, the data unit or bit 302 is set to one in field 300 in an operation 408. Field 300 is provided in a beacon frame or probe response frame in operation 408 by module 232 or module 234. The beacon message or probe response message is sent by AP 212 and received by STA 202 in an operation 410. STA 202 processes the beacon message in using beacon module 232 or the probe response message using probe module 224 and cancels association and authentication using association modules 238 and 226. Cancelling the association operation involves ceasing attempts for a time period to associate with the AP in some embodiments. In some embodiments, the time period can be a set time period or until the next message (e.g., when the next beacon message is received). At an operation 412, STA 202 seeks a connection with other APs (e.g., APs 214 and 216) using flow 400 in some embodiments. After operations 406, 410, and/or 412, AP 212 returns to operation 402.

In some embodiments, a number of implementations of flow 400 can operate simultaneously in communication system 200. Flow 400 can be performed in firmware executing on the hardware of STAs 202, 204, and 206 and APs 212, 214, and 216. The firmware can operate in a layer of a protocol stack or the MAC layer of STAs 202, 204, and 206 and at least one of APs 212, 214, and 216.

Figure 5:
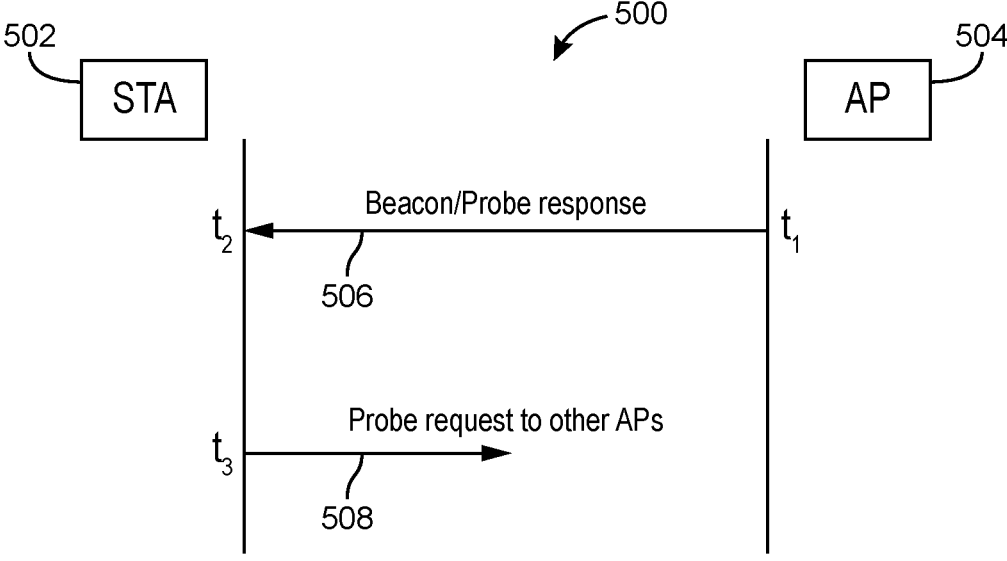
FIG. 5 is an example timing diagram of an AP access operation that uses the field illustrated in FIG. 3, according to some embodiments.

With reference to FIG. 5, a timing diagram 500 of management communications between a STA 502 (e.g., STAs 202, 204, and 206) and an AP 504 (e.g., APs 212, 214, and 216) includes a beacon or probe response message 506. The beacon or probe response message includes bit 302 in field 300 (FIG. 3). AP 504 provides the beacon or beacon or probe response message 506 at a time $t_1$. At a time $t_2$ after time $t_1$, STA 502 receives the beacon or probe response message and processes the message to determine whether the bit 302 in field 300 is set, thereby indicating whether AP 504 is available for a new connection. If not, STA 502 cancels the attempt for connection (e.g., the authentication and association operations) with AP 504 and submits a probe request message 508 to other APs. If so, STA 502 continues the authentication and association operations and does not provide probe request message 508 to other APs. In some embodiments, the cancellation occurs before the authentication and association operations begin or occurs during the time for the probing operations.

Advantageously, STA 502 can reduce the time to establish a connection (e.g., associate with or join an AP) by at least 10-200 milliseconds or more depending on medium activity (e.g., at least 40-50 milliseconds) by using the bit 302 in field 300. If the bit 302 in field 300 is not used, STA 502 and the AP continue to send and receive associate and authorization messages (authorization request, authorization acknowledge, association request, and association acknowledge messages) until the disassociate/deauthorize message is provided by AP 504. These messages are generally provided after time $t_2$. Providing the associate and authorization messages while waiting for the associate and authorization messages consumes time and communication overhead. In some embodiments, the probe request message, the acknowledge probe request message, the probe response message, and the probe response acknowledge message are also sent and received after time $t_2$ further contributing to time and overhead losses. In some embodiments, STA 502 can send to the AP 504 an acknowledge message to the beacon or probe response message 506 indicating that STA 502 has received the indication that a new connection is not available.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beamformers and/or beamformees) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C #, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:

1. A method, comprising:
   providing at least one bit in an extended capability information element of a beacon frame or a probe response frame used before association of an access point and a station, the at least one bit indicating availability or unavailability of the access point to provide service to the station, wherein the availability or unavailability is determined by determining a number of ports available, the service being a new connection to the access point; and
   receiving the beacon frame or the probe response frame and cancelling the association in response to the at least one bit indicating the unavailability of the access point to provide the service to the station.

2. The method of claim 1, wherein the beacon frame or the probe response frame is provided by the access point according to an 802.11 protocol.

3. The method of claim 2, wherein the 802.11 protocol is an 802.11e protocol.

4. The method of claim 1, wherein the at least one bit is provided in a basic service set (BSS) load information element and the availability or unavailability is further determined by determining an amount of bandwidth available.

5. The method of claim 1, wherein the at least one bit is provided in reduced neighbor report (RNR) information element.

6. The method of claim 1, whereby the cancelling saves time because authentication and association operations are not performed.

7. The method of claim 1, further comprising:
   completing the association in response to the at least one bit indicating the availability of the access point to provide the service to the station.

8. The method of claim 1 wherein the at least one bit is provided in the beacon frame and the association is cancelled before a probe request is provided to the access point from the station.

9. The method of claim 1, wherein the station comprises a laptop, a desktop computer, a personal digital assistant, another access point or a phone.

US 12,587,952 B2

15

10. A device, comprising:
circuitry configured to provide at least one bit of a beacon frame or a probe response frame used before association of an access point and a station, the at least one bit indicating availability or unavailability of the access point to provide service to the station, wherein the availability or unavailability is determined by determining a number of ports available, the service being a new connection to the access point.

11. The device of claim 10, wherein the beacon frame or the probe response frame is provided by the access point according to an 802.11 protocol.

12. The device of claim 10, wherein the at least on bit is provided in an extended capability information element of the beacon frame or the probe response frame.

13. The device of claim 10, wherein the at least one bit is provided in a BSS load information element of the beacon frame or the probe response frame.

14. The device of claim 10, wherein the at least one bit is provided in an RNR information element of the beacon frame or the probe response frame.

15. The device of claim 10, wherein the circuitry is configured to determine the availability or the unavailability of the access point to provide the service to the station, and reset the at least one bit when the access point has the availability, wherein the availability or unavailability is further determined by determining an amount of bandwidth available.

16. The device of claim 10, wherein the availability or unavailability is determined by determining the number of ports and an amount of bandwidth available.

17. A device, comprising:
circuitry configured to receive a beacon frame or a probe response frame from an access point before association of the access point and station, the circuitry being configured to process at least one bit indicating availability or unavailability of the access point in the beacon frame or the probe response frame, wherein the availability or unavailability is determined by determining a number of ports available, to provide service to the station and cancel the association in response to the at least one bit indicating the unavailability of the access point to provide the service to the station, the service being a new connection to the access point.

18. The device of claim 17, wherein the at least one bit is received in an extended capability information element of the beacon frame or the probe response frame, in a BSS load information element of the beacon frame or the probe response frame, or in an RNR information element of the beacon frame or the probe response frame.

19. The device of claim 17, wherein the circuitry is configured to provide in response to the at least one bit indicating the availability of the access point to provide the service to the station a probe request or an authentication request in response to the at least one bit indicating the availability of the access point to provide the service.

20. The device of claim 17, wherein the circuitry is configured to process the at least one bit indicating the availability or the unavailability of the access point in the beacon frame and cancel the association in response to the at least one bit indicating the unavailability of the access point to provide the service to the station before providing a probe request to the access point, wherein the availability or unavailability is further determined by determining an amount of bandwidth available.

* * * * *